G. HILLER.
MACHINE FOR LEASING WARPS.
APPLICATION FILED AUG. 26, 1908.
983,995.
Patented Feb. 14, 1911.
8 SHEETS—SHEET 1.
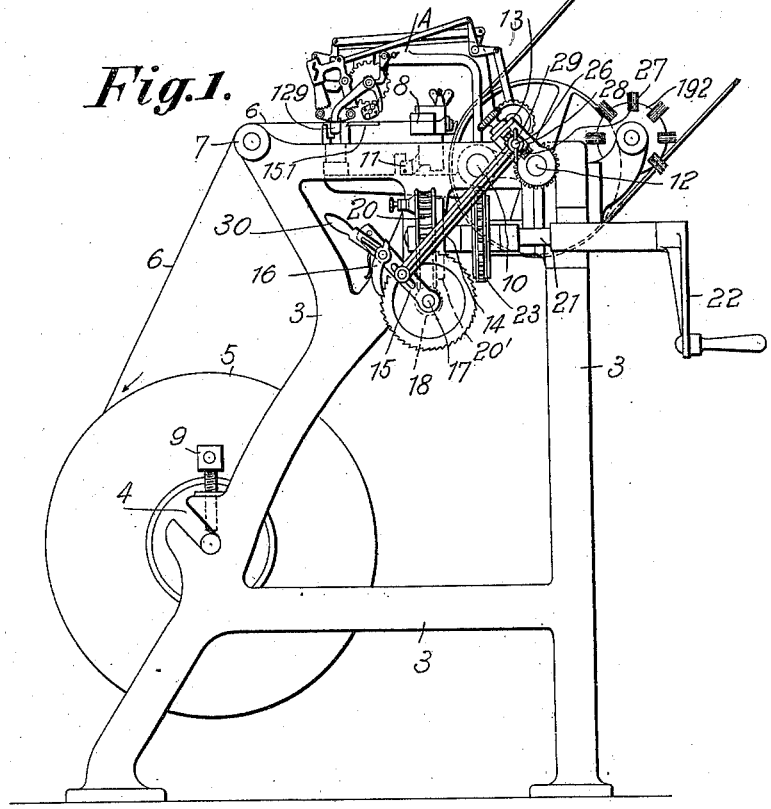
Fig. 1.
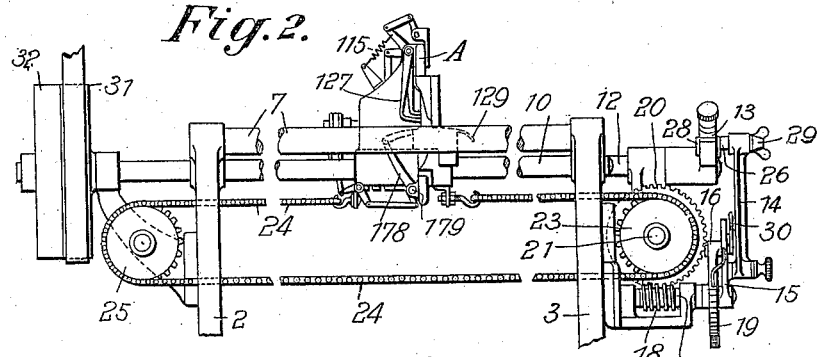
Fig. 2.
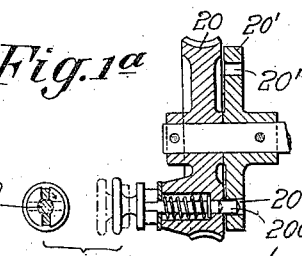
Fig. 1ª
Witnesses
C. H. Crawford
E. Schallenger
Inventor:
Gustav Hiller
by B. Singer Attorney

G. HILLER.
MACHINE FOR LEASING WARPS.
APPLICATION FILED AUG. 26, 1908.

983,995.

Patented Feb. 14, 1911.
8 SHEETS—SHEET 2.

Fig. 3.

Witnesses:
C. H. Crawford
E. Schallinger

Inventor:
Gustav Hiller
by B. Singer Attorney

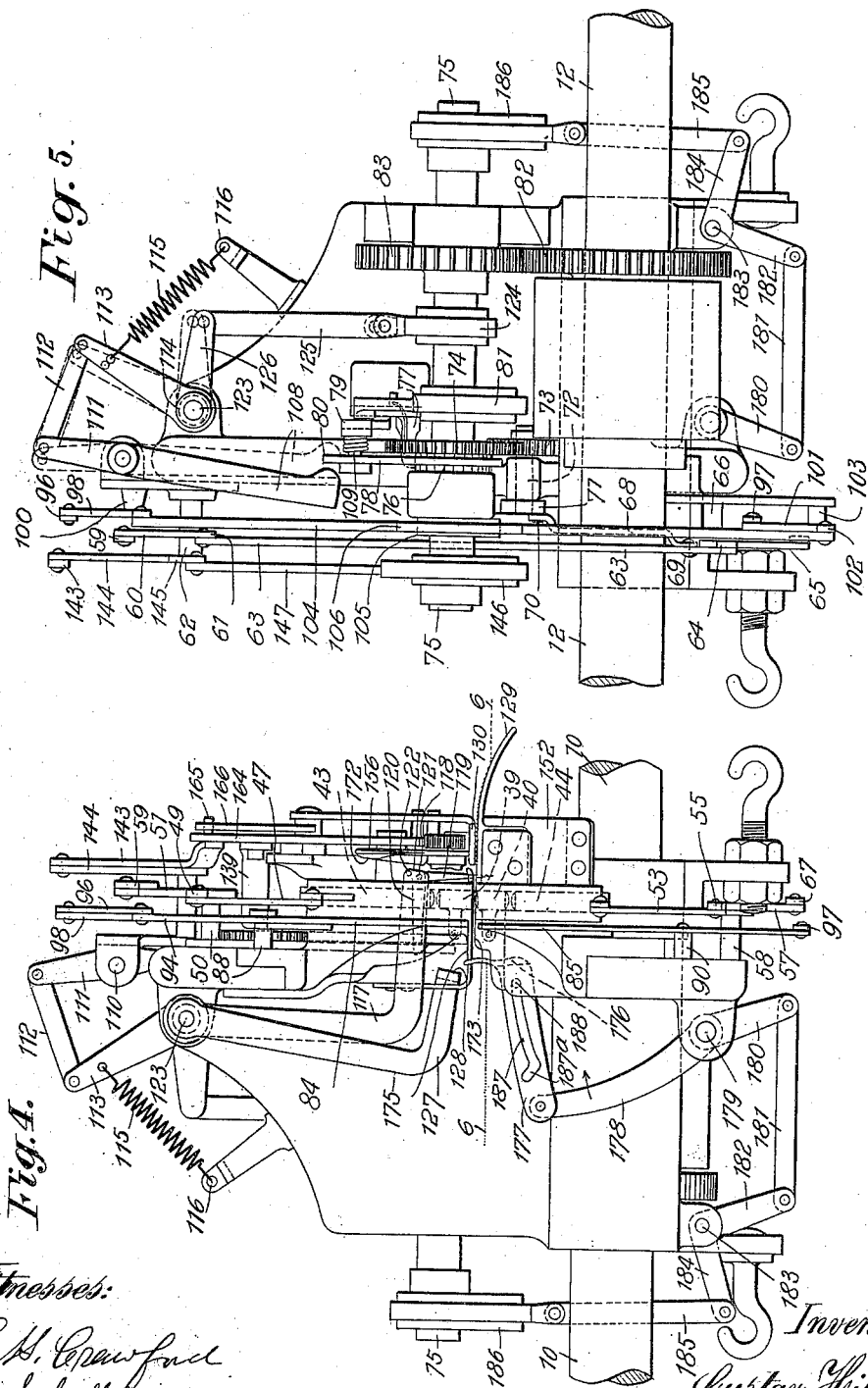

G. HILLER.
MACHINE FOR LEASING WARPS.
APPLICATION FILED AUG. 26, 1908.
983,995.
Patented Feb. 14, 1911.
8 SHEETS—SHEET 4.
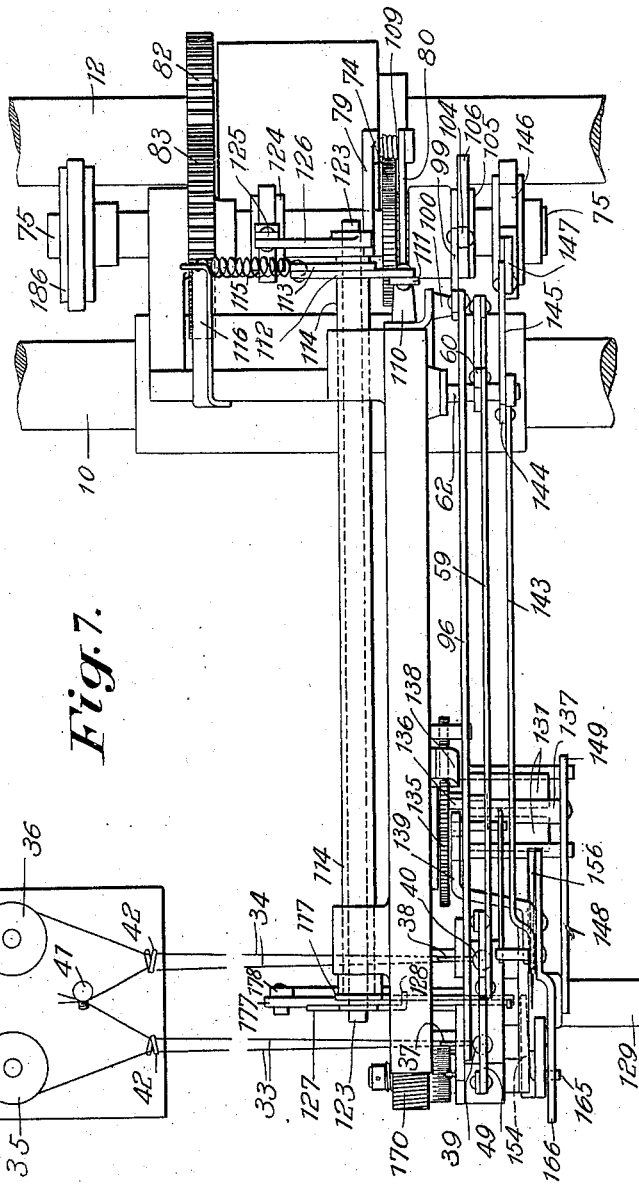
Witnesses:
C. H. Crawford
E. Schallinger
Inventor:
Gustav Hiller.
by B. Singer Attorney.

G. HILLER.
MACHINE FOR LEASING WARPS.
APPLICATION FILED AUG. 26, 1908.
983,995.
Patented Feb. 14, 1911.
8 SHEETS—SHEET 5.
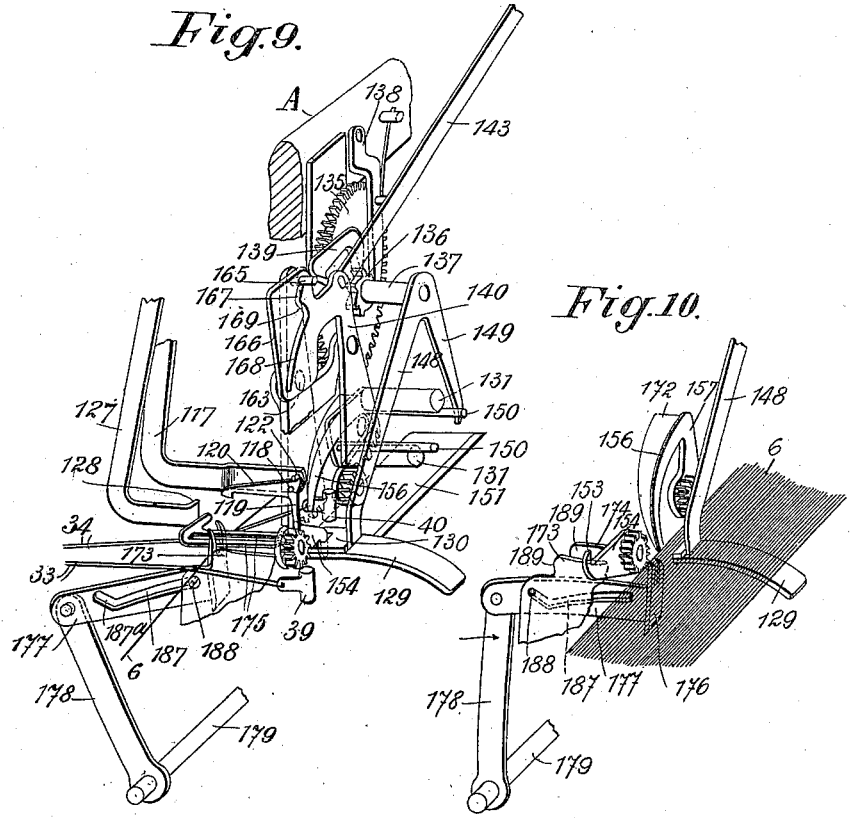
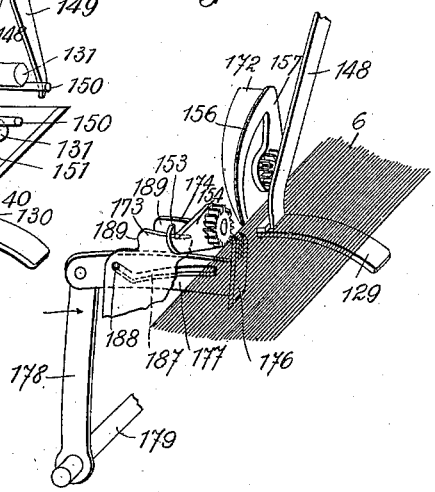
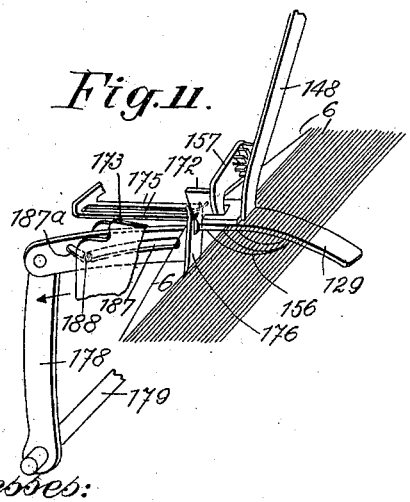
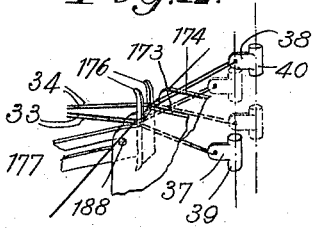
Witnesses:
C. H. Crawford
E. Schallinger
Inventor:
Gustav Hiller
by B. Singer
Attorney

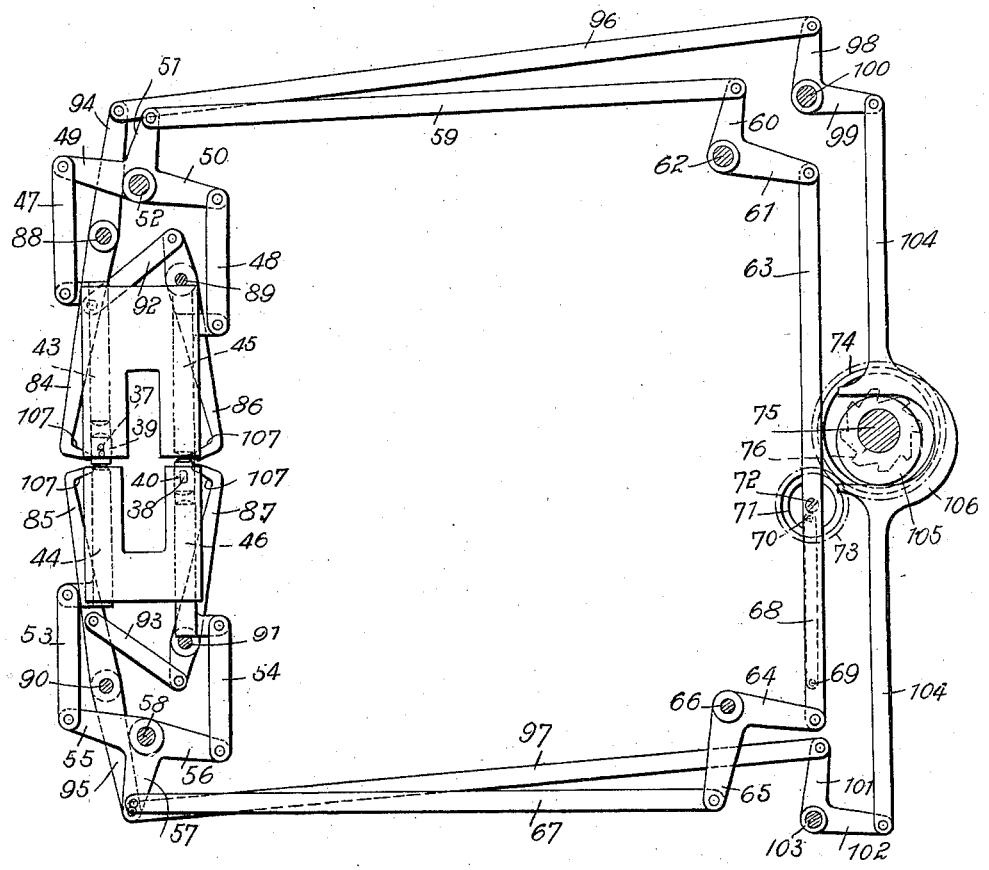

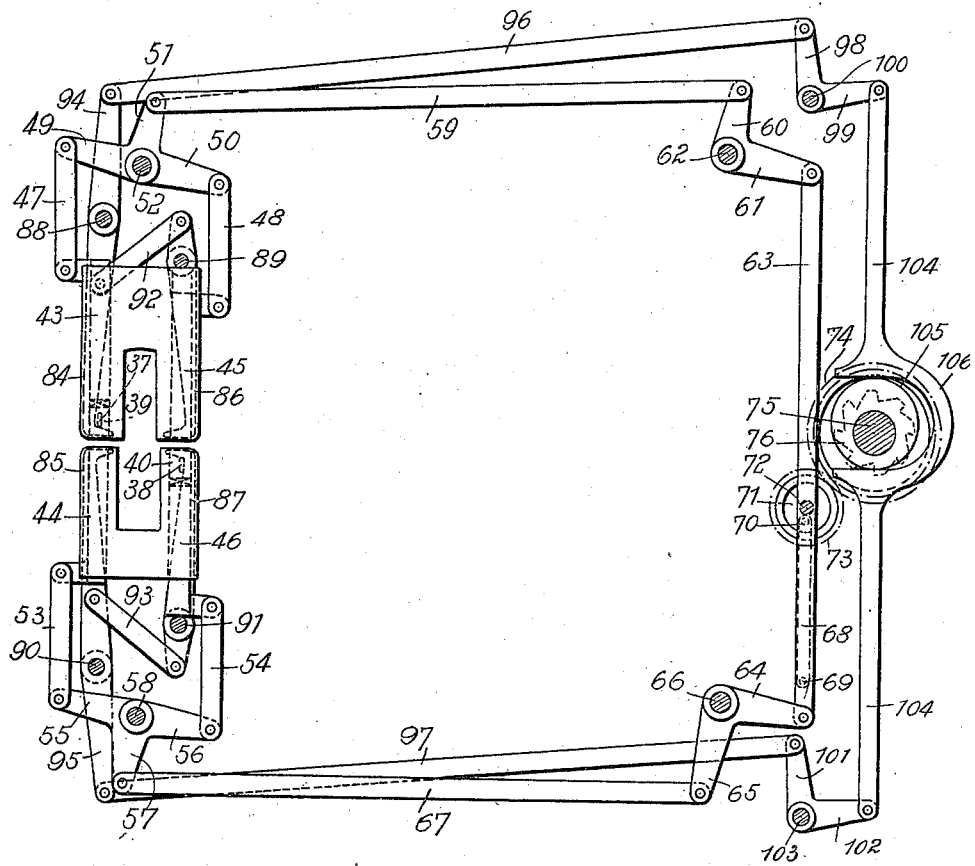

G. HILLER.
MACHINE FOR LEASING WARPS.
APPLICATION FILED AUG. 26, 1908.
983,995.
Patented Feb. 14, 1911.
8 SHEETS—SHEET 8.
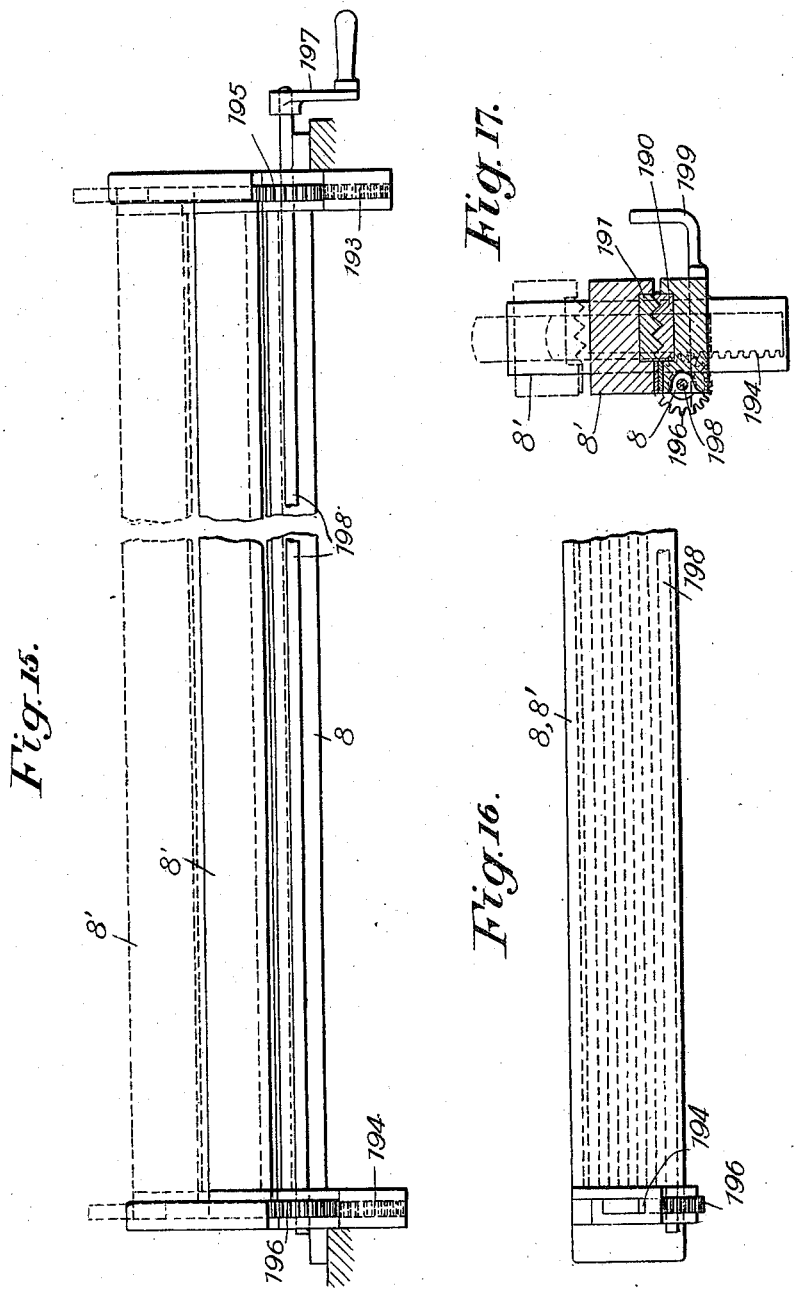

UNITED STATES PATENT OFFICE.

GUSTAV HILLER, OF ZITTAU, GERMANY.

MACHINE FOR LEASING WARPS.

983,995.

Specification of Letters Patent. Patented Feb. 14, 1911.

Application filed August 26, 1908. Serial No. 450,360.

*To all whom it may concern:*

Be it known that I, GUSTAV HILLER, a subject of the German Emperor, and resident of Zittau, Saxony, Germany, have invented certain new and useful Improvements in Machines for Leasing Warps, of which the following is a specification.

The subject matter of this invention is a machine for leasing warps which is distinguished from the machines of this kind known until now in that the formation of the lease is effected by alternating the position of the lease holding means (lease threads, lease bars, lease wires) above and below the plane of the warp. Owing to this arrangement the continuous change in the tensions of the warp threads and consequently also the special arrangement for compensating the different tensions of these warp threads are avoided and the machine becomes directly suitable for inserting the lease threads over the whole width of the warp without interruption. As a secondary result these arrangements according to the present invention allow not only the employment of flexible but also that of rigid lease holding means.

A warp leasing machine only yields a profit when it is adapted to work in the same manner and with the same security any kinds of warps. This result is obtained in the machine, object of the present invention, by the provision of a device for separating the warp thread which is about to be leased, this device being adapted to be adjusted very easily for warp threads of any thickness. This device furthermore works so as to force all the warp threads which are nearest the machine, in a juxtaposed position in the same plane thus preventing with certainty the superposition of warp threads when the latter arrive into the zone of action of the separating device for the different threads to be leased.

The machine which is moved in the well known manner step by step across the warp, forces the warp threads to juxtapose themselves in the plane of the warp, separates hereafter the next following warp thread from the remaining threads and conveys it between the means for alternating the position of the lease holding means above and below the warp plane on the opposite side of the machine to deliver it on this side to a holding device which is connected with the machine itself.

The annexed drawings, given by way of example show one form of embodiment of my improved machine wherein the means for alternating the position of the lease holding means are adapted to move in opposite directions in a plane which is at right angles with the warp plane and parallel with the warp threads.

During the operation, the driving means of the lease holding means are temporarily separated from the means for alternating the lease holding means with a view of allowing the warp thread about to be leased to pass between the former and the latter. With a view of allowing this temporary separation of the driving device which is positively connected with the means for alternating the positions of the lease holding means in spite of the forcible motion of these lease holding means, the machine which forms the subject matter of the present invention is constructed in such a manner that after each reversing operation, the complete conveying of the lease holding means on the respective opposite side of the warp and the ascertaining of this position are affected by shifting means movably arranged above and below the warp, and adapted to act at the same time as locking means and to take hold of and to completely adjust the lease holding means which have been brought into their working path.

In the drawings: Figure 1 is a side elevation view of the entire machine, Fig. 1ª shows a sectional view of a detail of the controlling mechanism. Fig. 2 shows a partial front elevation of the entire machine, while Fig. 3 is a side elevation view of same taken from the entry side of the warp threads; Fig. 4 is a front elevation view; Fig. 5 a back elevation view and Fig. 7 a top plan view of the leasing machine proper. Figs. 6 and 8 show details and Figs. 9 to 12 are perspective views of different working positions of the relative coöperating means, these views being intended to explain the manner of working the tools for separating the warp thread about to be leased and of the leasing tools. Figs. 13 and 14 are elevation views of the means for alternating the position of the lease holding means together with their driving mechanism in two different positions and Figs. 15 to 17 show another embodiment of the thread clamping device, Fig. 15 being a front elevation view; Fig. 16 a partial top plan view and Fig. 17 a vertical cross section of same.

The framework of the machine comprises two lateral walls rigidly connected together, 2, 3 (Figs. 1 and 2) and provided at their front sides with slot bearings 4 adapted to receive the journals of the warp beam 5 carrying the warp 6. The latter is conveyed over a breast beam 7 arranged at the front and above, on the lateral walls 2, 3 and which, if necessary, may be in the form of a roller, to a clamping device 8. The latter is adapted to hold the entire width of the warp and is secured to the lateral walls behind the leasing device of the warp leasing machine A which may be shifted in the well known manner in the framework of the machine in an oblique direction to the warp.

In order to avoid the repeated insertion and fixation of the ends of the warp threads in the clamping device, the clamping device 8 is preferably constructed in such a manner that it is adapted to receive the thread clasp which is permanently secured in the well known manner to the end of the warp. Tension is imparted to the warp 6 after the clasp has been inserted into the machine clamping device 8, by rotating the warp beam 5 in the direction of the arrows shown by the drawing and fixing the journals of the warp beam in the bearings 4 by means of set screws 9. The upper movable jaw 8' of the clamping device 8 is preferably arranged in such a manner that its rising and lowering motions take place parallelly to the stationary jaw. Such a form of construction of the clamping device has been shown by Figs. 15 to 17. In this device the jaws 8 and 8' are provided with longitudinally fluted clamping portions 190, 191 adapted to allow of the warp being tightly secured. The uniform tension of the warp threads is then obtained by means of a brush roller 192, Fig. 1, which is rotatably mounted behind the framework of the machine. The warp after having been secured at its end in the usual clasp remaining in a permanent manner upon it, is drawn between the open clasping device 8, 8' and put over the brush roller 192 which is then rotated and thus exerts a uniform traction on all the warp threads which thus are uniformly tensioned. Hereafter the thread clamping device 8, 8' is closed and the warp is clamped in a tensioned condition as the warp had been previously prevented from rotating in the above described manner so that the tension cannot be released during the working.

The opening and closing of the clasping device is effected by means of toothed racks 193, 194 secured to the upper jaw 8' and vertically guided in the lower jaw 8, these toothed racks being arranged on both ends of the jaw, and actuated by means of spur wheels 195, 196 meshing with the said toothed racks and keyed upon a shaft 198 journaled in the lower jaw and provided with a crank 197. As readily seen by rotating the crank in one direction or in the other, the clamping device may be opened or closed the upper jaw being parallelly guided. After the warp threads have been clamped in the clamping device 8, 8', the end of the warp is wound upon the thread clasp suspended from the end of the warp and the clasp is secured to the thread clamping device 8, 8' for instance by putting it into hooks 199 provided on the clamping jaw 8.

The machine A is carried and guided by a guide rod 10 supported at its end in the side walls 2, 3 and by a prismatic guide 11 which for instance is rigidly connected with the clamping jaw 8. The guiding is completed by the driving shaft 12 rotatably mounted in the lateral walls 2, 3 and which imparts the working motion to the various parts of the machine and produces the shifting of the machine across the warp. To the last mentioned end a crank 13 the stroke of which may preferably be varied is secured to one end of the shaft 12. This crank is connected by a link 14 with an oscillating lever 15 which carries a spring controlled pawl 16 adapted to be engaged and disengaged, and is freely mounted on a stud 17 secured in the lateral wall 3 of the framework of the machine. The stud 17 also carries rotatably a ratchet wheel 19 rigidly connected with a worm 18. The latter meshes with a worm wheel 20 keyed upon a crank shaft 21 carrying a crank 22 and arranged at right angles with reference to the shaft 12. The worm wheel 20 is loosely mounted on the shaft 21 (Fig. 1ᵃ) and may be coupled therewith by means of a coupling disk 20' rigidly secured to the shaft 21 and provided with holes 20'' adapted to be engaged by a spring controlled engageable and disengageable pin 200 mounted on the worm wheel 20; this pin may also be provided with means for securing it in its disengaged position. Secured to shaft 21 is a sprocket wheel 23 over which runs a chain 24 conveyed on the opposite side of the machine over a sprocket wheel 25 having the same diameter, the warp leasing machine A being inserted in the upper part of the chain 24.

The adjustability of the stroke of the crank 13 on shaft 12 may for instance be secured by arranging the crank pin 26 on a nut 27 mounted in the crank arm so as to be adapted to rotate but not to be shifted, the said nut 28 being adapted to be locked in position after adjustment by a locking screw 29 passing through the crank pin 26. It is necessary to provide a disengageable coupling between the shaft 21 and the worm wheel 20 in order to allow of the machine A being rapidly brought back by means of the crank 22 after the leasing of the warp has been finished. Owing to the disengageable arrangement of the pawl 16 the coupling device may be released from the tension of the shifting chain which facilitates the disengagement of the coupling. In order to allow the disengagement of the pawl 16 the latter is positively connected in the embodiment shown by the drawings, with a disengaging lever 30 adapted to oscillate on the pivot of the pawl and to be fixed in its two extreme positions on the pawl lever 15 in any suitable manner such as for instance by means of spring controlled locking devices. On the opposite side of the machine, the shaft 12 carries a fixed pulley 31 and a loose pulley 32 adapted to receive a driving belt. The drive may however be performed in any other desired manner for example directly by a motor.

The disengaging of the machine is effected after each achievement of a warp, either by hand or by the machine A itself which acts upon an adjustable arm of the disengaging device after having traveled over the entire width of the warp.

The lease holding means are in the embodiment shown formed by lease threads 33, 34 which are unwound from stationary bobbins 35, 36 passed through eyelets 37, 38 and drawn in the form of loops by slides 39, 40 (Fig. 7) and the ends of which are secured in a stationary clasp 41 or in any other suitable manner. With a view of rendering the thread loops not too large, the loops are preferably passed again through thread guides 42.

It will be found suitable to secure the clasp 41 to the lower part of the claim 24 so that during the work of the machine this clasp is always moved in the opposite direction to that of the machine. Owing to this arrangement the lease cords or threads are released in the proportion to the advancing motion of the machine and thus are saved.

The slides 39, 40 provided with the eyelets 37, 38 for the lease holding means 33, 34 are guided in suitable guides above and below the warp in the framework of the machine in a plane which is parallel to the warp threads and perpendicular to the warp plane. They are moved in opposite directions. The slides 39, 40 are actuated by pushing rods introduced from above and from below into their guide ways and of which the pushing rods 43, 44 take between themselves the slide 39 and the pushing rods 45, 46 the slide 40 (see Figs. 3 and 4). The guide ways of the slides 39 and 40 are interrupted at the height of the plane of the warp and the upper and lower pushing rods only move to the vicinity of the warp, while the motion of the slides above or below the warp is effected by other means. The pushing members for the slides 39, 40 are connected together in pairs with a view of moving them in opposite directions (see also Figs. 13 and 14). Thus the two pushing members 43 and 45 situated above the warp are connected by links 47, 48 with the arms 49, 50 of a three armed lever 49, 50, 51 which may be oscillated on a stationary pivot 52 secured to the machine frame, while links 53, 54 connect the pushing members 44 and 46 arranged below the warp, with arms 55, 56 of the three armed lever 55, 56, 57 which also may be oscillated on a stationary pivot 58 secured to the framework of the machine. The arm 51 of the three armed lever 49, 50, 51 is connected by a connecting rod 59 with the arm 60 of an angle shaped lever 60, 61 which is adapted to oscillate on a stationary pivot 62 of the framework of the machines and the other arm 61 of which is hingedly connected with the upper end of the vertical connecting rod 63 the lower end of which is connected with the arm 64 of an angle lever 64, 65 adapted to oscillate on a stationary pivot 66 of the framework of the machine and the arm 65 of which is connected by a connecting rod of with the arm 57 of the three armed lever 55, 56, 57. A connecting rod 68 which at 69 is connected with the connecting rod 63 and grasps at its upper end of the crank pin 70 of the crank disk 71 secured to a shaft 72 which is rotatably mounted in the framework of the machine, connects the connecting rods 63 with the crank disk 71. The latter is rigidly connected with a spur wheel 73 which continuously meshes with a spur wheel 74 adapted to loosely rotate on the main shaft 75 of the machine. The ratio of multiplication between the spur wheels 73 and 74 is 1:2. The spur wheel 74 is rigidly connected with a ratchet wheel 76 adapted to be engaged by a spring controlled counter pawl 77 the object of which is to prevent backward rotation, as well as by a spring controlled pawl 78. The latter is rotatably mounted on the free end of an oscillating arm 79 and is provided with an arm 80 adapted to disengage the pawl in the manner to be described later on, if it is not desired to produce the change of the lease carrying means, when no thread has been conveyed to the leasing device. The oscillating arm 79 receives motion from an eccentric 81 the stroke of which has been calculated in such a manner that the actuating pawl 78 at each stroke causes the ratchet wheel 76 to rotate a quarter of a tour whereby the crank disk 71 owing to the ratio of multiplication of 1:2 is each time rotated by 180°.

The drive of the main shaft 75 is effected from the shaft 12 by means of spur gear wheels 82, 83 of equal dimensions the first of which is adapted to be slid on the shaft 12 while being prevented from rotating thereon, the latter spur gear wheel being rigidly secured to the main shaft 75 of the machine.

Each complete stroke of the crank disk 71 is followed by a change of position of the slides 39 and 40 adapted to be moved in opposite directions so that always one of them is below and the other above the warp 6. However, as the pushing members receive by the crank disk 71 from either side a motion going not so far as the plane of the warp, lifting means are still necessary which are arranged above and below the plane of the warp and are adapted to act upon the means for changing the position of the lease holding means in such a manner that they transport the said means independently from the pushing members from the one or the other side on the opposite side of the warp plane. The embodiment shown by the drawings for this purpose comprises for each slide 39 and 40 a pair of driving hooks 84, 85 and 86, 87 respectively (see also Figs. 13 and 14) adapted to be oscillated on stationary pivots 88, 89, 90 and 91 arranged on the framework of the machine and of which those which are situated above and those which are situated below the warp are connected together by means of links 92, 93 so as to force them to move simultaneously toward one another. Each of the driving hooks of the upper and of the lower pair is actuated from the main shaft 75 of the machine. Thus the driving hooks 84 and 85 have received the shape of two armed levers one of the arms of which (94 and 95 respectively) is connected by a connecting rod 96 and 97 respectively and an angle lever 98, 99 having its fulcrum at 100 and angle lever 101, 102 with the fulcrum at 103 with the opposite ends of a connecting rod 104 provided about in its middle portion with a loop 106 surrounding an eccentric 105 on the main shaft 75 so that during the rotation of the shaft 75 the connecting rod 104 alternately receives an ascending and a descending movement. The driving hooks 85 have inclined working surfaces 107 acting like wedges upon the projecting eyelets provided on the slides 39 and 40 and consequently force the slides 39, 40 to continue their motion in the same direction in which they previously had received their motion by the pushing members.

In order to render impossible the change of position of the lease holding means when no thread is to be leased the actuating pawl 78 is rendered in this case ineffective by disengaging it from the ratchet wheel 76 when the actuating arm 79 moves upward. To this end a movable abutment 108 adapted to be adjusted by a thread feeler is brought into the path of the arm 80 of the pawl 78 so that the arm 80 is stopped and the pawl forced to perform a rotary motion on its pivot 109 at the end of the actuating arm 79 thus disengaging the pawl from the ratchet wheel 76. The movement of this abutment 108 into its working position is performed by coupling it with a continuously moved member by means of a carrying on hook rigidly connected with a thread feeler, the latter and the carrying on hook being rigidly connected with the movable abutment 108.

In the embodiment shown by the drawings, the movable abutment 108 is provided with an arm 111 which is extended beyond its fulcrum 110 and is connected by a link 112 with an arm 113 arranged on a hollow shaft 114 which is journaled in the machine so as to be parallel to the threads of the warps. The arm 113 is constantly acted upon by a spring 115 the opposite end of which is secured at 116 to the framework of the machine and forces the abutment 108 constantly into its position of rest shown in plain lines by Fig. 5. Secured to the other end of the hollow shaft 114 is an arm 117 which at its lower end is angularly bent between the means for changing the position of the lease holding means and carries at its front end an angle lever 119, 120 (Fig. 4) adapted to be oscillated on a bolt 118 and the arm 119 of which is downwardly directed and projects downwardly beyond the plane of the warp, while the other arm 120 which is more horizontally arranged, has received the shape of a hook. The crank lever 119, 120 may oscillate on pivot 118 its oscillation being however limited so that when the crank lever occupies its position of rest, the arm 119 thereof is directed perpendicularly downward. The limitation of the said oscillations is effected by an extension 121 provided on the crank lever 119, 120 and adapted to abut against a pin or the like 122 secured to the arm 117.

The hollow shaft 114 contains a rotatable spindle 123 which by the shaft 75 receives at each working course of the machine an oscillatory motion through an eccentric 124 connecting rod 125 and lever arm 126. Secured to the other end of said spindle 123 is an arm 127 which similarly to arm 117 is engaged with an angular bend between the means for changing the position of the lease holding means the said arm 127 being provided at its free end with a projection 128 which is directed toward the arm 117 and adapted to be engaged by the carrying on hook 120 when the feeler 119 is not moved by a warp thread transported across the machine, in such a manner that it raises the carrying on hook 120, that is to say when it once happens that a warp thread is missing.
Owing to the coupling which is then produced between the arm 117 and the continuously reciprocated arm 127, the arm 117 also receives an oscillating motion which brings the abutment 108 above the arm 80 of the pawl 78 so that the latter is disengaged from the ratchet wheel 76 when the actuating arm 79 is raised (see Fig. 6).

Through change of the position of the lease holding means, effected each time, after the leasing of a warp thread, one time the one and the next time the other lease holding means is brought above the leased thread whereby the lease is formed. It is however essential for the security and good working of the machine that each time only a single warp thread is leased and to this effect means must be provided which are adapted to allow with certainty the separation from the remaining warp threads of that thread which is about to be leased at each operation of the machine. These means, as the machine must be adapted to be applied to all kinds of warp and warp threads of any thickness, must be adapted to be controlled so as to be suitable for the thickness of the warp threads about to be treated.

In general, in order to render possible the separation of a single thread from the warp, by the machine which is moved across the latter, it is first necessary to force the warp threads which are immediately in front of the leasing tools, into the plane of the warp and one at the side of the other. To this end a device has been provided which smoothes the warp threads while simultaneously increasing their tension so that threads which perhaps would be superposed or crossing, are ranged side by side. For this purpose a curved receiving surface 129 rising above the plane of the warp is secured to the framework of the machine this receiving surface projecting in the direction of travel of the machine in front of the leasing tools. The free end of this receiving surface projects below the plane of the warp so that when the machine moves forward the warp threads travel upon the receiving surface 129 and are gradually raised by the latter whereby their tension is by little and little increased. This operation already ranges the warp threads one by the side of the other. However in order to avoid in any case any superposition of warp threads a pressure plate 130 arranged in front of the leasing tools and moved against the receiving surface 129 temporarily exerts pressure on the warp threads while at the same time or alternately a smoothing of the warp threads in front of the leasing tools is performed by smoothing members 131 moved toward the end of the warp. These smoothing members 131 may for instance be arranged on a rotary carrier 132 mounted on a shaft 133 journaled in the framework of the machine and carrying a spur gear wheel 134 which constantly meshes with a larger spur gear wheel 135. The latter is rigidly connected with a ratchet wheel 136 having for instance six teeth and is rotatably mounted together with the latter on a peg 137 secured to the framework of the machine. The ratio of multiplication between the spur gear wheels 135 and 134 is 3 to 1 so that at each rotation of the wheel 135 by one sixth of a revolution, the wheel 134 is rotated by one half of a revolution. Now, as the carrier 132 which is connected with the wheel 134 has two smoothing members 131 arranged in diametrical opposition, one of the two smoothing devices acts upon the warp threads at each rotation of the wheel 135 by one sixth of a revolution.

The ratchet wheel 136 is engaged by a spring controlled counter-pawl 138 preventing it from rotating backward, as well as by a spring controlled pawl 139 pivotally connected at 141 to an arm 140. The arm 140 is adapted to oscillate on a pivot 142 secured to the framework of the machine and is connected by a connecting rod 143 with the arm 144 of an angle lever 144, 145 adapted to be oscillated on pivot 62 secured to the framework of the machine, the lever 144, 145 receiving its motion from the main shaft 75 by means of an eccentric 146 the rod 147 of which is pivotally connected with the arm 145 of the crank lever 144, 145.

For moving the pressure plate 130 against the warp and the receiving surface 129 any desired suitable means may be provided. In the example shown by the drawings, the pressure plate 130 is carried by a lever 148 which is adapted to freely oscillate on the shaft 137 and is provided with an angularly directed arm 149 directed toward the carrier 132 of the smoothing members 131. This arm 149 projects into the path of cams or pegs 150 two of which are arranged in diametrical opposition on the carrier 132. In the relative arrangement, shown by the drawings, of the smoothing members with reference to the cams 150 pressure is exerted upon the warp threads by the pressure plate 130 at the beginning of the smoothing action. In order to hold the smoothing members for a greater length in contact with the warp threads and at the same time exert upon the latter during the whole smoothing action a pressure which is as uniform as possible, the smoothing members 131 may be yieldingly mounted on their carrier or rather one may, as in the arrangement shown by the drawings, provide under the smoothing members a bearing surface or plate 151 for the warp thread which is yieldingly secured to the framework of the machine. The plate 151 is for instance yieldingly connected at one of its ends by a flat spring 152 with the framework of the machine. Its upper surface is arranged so as to be level with the highest part of the receiving surface 129.

The end of the receiving surface 129 which is directed toward the leasing tools as well as the corresponding end of the pressure plate 130 are preferably provided with notches which guide the tools for the individual separation of the threads which freely lie over the notch. These notches are most clearly shown by Figs. 9 to 11.

The device for separating the warp thread about to be leased from the remaining threads which device may also be employed for the same purpose in other machines for instance in warping machines comprises an abutment 153 serving as a stop for the warp thread to be leased and which with a view of allowing the warp thread to be leased to continue its motion toward the leasing tools, is movably arranged and to this end mounted for instance on an arm 154 secured on an oscillating shaft 155 journaled in the frame work of the machine above the plane of the warp. Movably arranged in front of the abutment 153 and at a distance corresponding to the thickness of the warp threads to be leased is a separating knife 156 which passes immediately along the opposite side of the warp thread to be leased and securely applied against the abutment 153, and thus separates this thread from the remaining warp threads. The knife 156 may have any suitable form and receive any suitable motion perpendicularly to the plane of the warp, the width of the knife blade being parallelly arranged to the warp threads.

In the embodiment shown by the drawing the knife 156 has received the form of a sickle and is secured to an arm 157 which is rigidly secured to a spur gear wheel 158 and is rotatably mounted on a stud 159 secured to the framework of the machine above the plane of the warp. With the spur gear wheel 159 meshes a toothed segment 160 rigidly secured to the arm 140 oscillating on the pivot 142. Consequently an oscillating motion is imparted to the spur gear wheel carrying the knife 156 at each working period of the machine. At the beginning of the downward motion of the knife between the warp threads, the abutment 153 occupies its working position (Figs. 3 and 9). But as soon as the thread to be leased has been separated by the point of the knife from the remaining threads and it is necessary to transport it farther toward the leasing tools, the abutment 153 must be removed from its working position. This may be obtained by the action of a spring, while the reverse motion i. e. that which brings it into its operative position, is effected forcibly. It is however advantageous to have both motions of the abutment effected positively, as this is the case in the example of execution shown in the drawings. To this effect the arm 154 carrying the abutment 153 is rigidly connected with a spur gear wheel 161 which constantly meshes with a toothed segment 162 which oscillates on a pivot 163 secured to the framework of the machine and is rigidly connected with an arm 164 extending beyond its fulcrum. This arm 164 carries a pin 165 engaging a curved slot provided in a plate 166 which is rigidly connected with the arm 140. The curved slot of the plate 166 is so shaped that while the pin 165 slides in the upper part 167 or in the lower part 168 of the curved slot no motion is imparted thereto, and that a motion of the pin 165 and consequently a rotation of the toothed segment 162 around the pivot in the one or the other direction only takes place when the pin 165 slides in the middle part 169 of the curved slot.

In order to enable the device for separating the thread to be leased to be adjusted for any thickness of warp thread which is likely to be met with, the abutment 153 may be adjusted with reference to the knife 156 according to the thickness of the warp threads of the warp to be treated in each case. This adjustment is preferably performed by means of a micrometric screw 170 especially shown by Fig. 8 in longitudinal section. The set screw 171 has for its object to secure each time the abutment 153 in its adjusted position. The thread to be leased and engaged between the movable abutment 153 and the knife 156, must now be introduced between the lease holding means which occupy their receiving positions after the abutment 153 has been removed by the above described means from its working position and been brought by them into a position wherein it allows the free passage to the separated threads. To this effect, the thread engaged by the knife is first gradually separated by a pushing device from the remaining warp threads and is conveyed to means adapted to transport it farther.

The pushing device or member is formed by a wedge surface 172 which is advantageously rigidly connected with the knife 156 and is arranged on that side of the latter which faces toward the lease holding means, this wedging surface entering into action when the motion of the knife is continued in the same direction as before. The thread is thereby pushed on a pair of wings or ribs 173, 174 rigidly mounted into the framework of the machine. During its travel the thread is prevented from accidentally jerking upward by a fork 175 arranged above it and equally secured to the framework of the machine. Between the ribs or wings 173, 174 moves a fork shaped engaging member 176 which is secured to the free end of a lever 177. The latter is hingedly connected to an arm 178 secured to an oscillating shaft 179 journaled in the framework of the machine. This shaft 179 carries on its opposite end an arm 180 which is connected by a link 181 with the arm 182 of a crank lever 182, 184 oscillating around a stationary fulcrum 183 and the other arm 184 of which is connected to the rod 185 of an eccentric 186 secured to the main shaft 75 of the machine (see Figs. 4, 5 and 7).

The lever 177 is provided with a curved slot 187 engaged by a guide pin 188 rigidly mounted to the framework of the machine, the said slot being slightly inclined downward nearly on its entire length from its front end to its rear end while it is suddenly obliquely directed upward at its rear end at 187$^a$.

With a view of grasping the separated warp thread which had been advanced toward the grasping members 176 the latter is firstly moved into its extreme right hand position (Figs. 4 and 10) by the above described means and by the oscillation of the arms 178 in the direction of the arrow shown by Fig. 4. In this position the guide pin 188 engages the rear end of the curved slot 187 wherefrom it follows that the grasping member 176 is slightly lowered in this position, while during the reverse motion of the arm 178 the member 176 is first slightly raised and engaged behind the thread which it is desired to grasp by means of its fork. During the further motion of the grasping member, in the opposite direction to that indicated by the arrow of Fig. 4, the thread engaged by the grasping member is carried on (Fig. 11) and brought behind the ribs 173 and 174 which at their ends form hook shaped notches 189. The thread then places itself behind the said notches and is held stationary by them. As soon as this has taken place, the changement of position of the lease holding means is performed in the manner described above (position shown by dotted lines in Fig. 12), so that these means are ready for receiving the next thread.

The function of the machine summed up is as follows: At the beginning of the work the stopped machine is moved into its extreme left hand position by means of the crank 22 after the pawl 16 has been disengaged with the aid of the disengaging lever 30 and after the coupling of the worm wheel 20 with the shaft 21 has been released. Hereafter the warp beam 5 carrying the warp 6 is engaged into the bearings 4 of the lateral walls 3 and the end of the warp secured in the clasp is drawn over the breast beam 7 through the opened clamping device 8, 8' and over the brush roller 192. The warp beam 5 is prevented from rotating and the warp uniformly tensioned over its entire width by the rotation of the brush roller 192 whereafter the warp is grasped by closing the clamping device 8, 8'. Thus the insertion of the warp into the machine is terminated when the device shown by Figs. 15-17 is used. It is still necessary to wind the end of the warp on the clasp 70 secured thereto and to put the clasp on the clamping device 8, 8' with a view of removing the end of the warp from the working path of the machine. After the lease threads 33, 34 have been threaded through the eyelets 37, 38 of the slides 39, 40 and after their ends have been secured in the clasp 41, the machine may be started by throwing the shaft 12 in gear, engaging again the pawl 16 and coupling the worm wheel 20 with the shaft 21.

As soon as the machine reaches the warp owing to the advancing motion imparted to the machine by the pawl 16 and the ratchet wheel 19, the first threads of the warp ascend the receiving surface 129, their tension being thereby gradually increased. Finally the threads arrive under the pressure plate 130. The latter which at each advancing stroke and consequently at each working period of the machine is once pressed down against the warp threads upon the receiving surface 129, as well as the simultaneous action of the smoothing members 131 over the yielding supporting surface 151, force the warp thread to juxtapose themselves so that they are arranged in front of the separating device and lie all parallelly side by side in the same plane.

As soon as the first thread has advanced near the movable abutment 153, it is separated from the remaining warp threads by the knife 156 which descends behind it. Thereafter the abutment 153 leaves its working position (Figs. 3 and 9) and goes into its position of rest (Fig. 10) while the knife 156 continues moving and causes the wedge shaped pushing member 172, which is secured thereto to act upon the separated thread and to convey it behind the grasping fork 175 which in the meanwhile has been brought into its receiving position. Hereafter follows the motion of this fork in the direction opposed to that indicated by the arrow in Fig. 10, whereby the upwardly directed end 187$^a$ of the curved slot 187 causes first an upward motion of the fork which allows the latter to grasp the thread which has been delivered to it (Fig. 11). The fork 176 continuing its motion in a direction which is opposed to that indicated by the arrow, Fig. 10, carries the thread on and conveys it between the lease holding means 33 and 34 and also behind the notches 189. In the meanwhile the knife 156 has returned into its position of rest and the abutment 153 has again resumed its working position so that the following warp thread may be separated at the next advancing motion of the machine. After the grasping member 176 has returned into its position of rest (Figs. 9 and 12) the position of the lease holding means is changed (position shown by dotted lines in Fig. 12) so that these means are also in position ready for receiving the next warp threads to be leased.

The change of the lease may be effected because the thread which has been leased has carried with it the feeler 119 during its travel through the machine, and thus has caused the carrying on hook connected therewith to leave the path of the extension 128 of the disengaging lever 127 so that the locking lever is held by the spring 115 in its position of rest (shown in full lines by Fig. 5), the pawl 78 remaining engaged with a view of giving the ratchet wheel 76 the necessary partial rotation and thereby transmitting the necessary rotary motion to the crank disk 71 which has to produce the change of position of the lease holding means. If however at the next working period of the machine the knife 156 is not yet adapted to reach the next thread and to separate it from the remaining threads the machine works without actuating a thread and if the change of position of the lease holding means were now performed, the lease would be disturbed, if in this case no provision were made for stopping the change of position of the lease holding means. As already described above, this stopping is performed by the thread feeler 119 conserving its vertical position, whereby the carrying on hook 120 connected with it, is adapted to engage the extension 128 of the disengaging lever 127 so that the lever 27 carries with it the lever 117 and thus forces the locking lever 108 against the action of the spring 115 into its locking position (shown by dotted lines in Figs. 5 and 6) so that it disengages the pawl 78 in the manner above described and shown by Fig. 6, and thus stops the change of position of the lease holding means. As soon as the separating means separate a new thread from the warp and convey it to the lease holding means, the change of position of the latter is again performed so that they again remain ready for receiving the following thread until the next thread has effectively been leased.

When the entire warp is leased the lease holding means are knotted on both sides of the warp or if desired replaced by lease rods. Hereupon the clamping device 8, 8' is opened and the end of the warp is wound upon the warp beam after the set screws 96 have been loosened. In the place of the finished warp, a new warp beam is inserted into the machine in the manner described after the machine had been brought back in the manner described into its initial position at the left hand of the machine. These lease holding means, in the present instance the lease threads, are conveyed from the bobbins through the thread guides and the eyelets at the slides 39, 40 and back through the thread guides to the stationary clasp 41 (which may also be secured to the lower part of the chain 24) and the leasing of the new warp may begin.

Having now fully described my said invention, what I claim and desire to secure by Letters Patent, is:—

1. In a machine for leasing warps the combination with the warp holding means, of lease holding members of means for causing the said lease holding members to change their position alternately from above to beneath the plane of the warp and from beneath to above the latter, means for moving the machine step by step across the warp, means arranged on one side of the machine and adapted to force the warp threads to juxtapose themselves in a plane and means for separating one after the other the warp threads from the remaining ones, said machine moving means in co-action with said thread separating means being adapted to cause change of the position of said warp threads individually with respect to said machine means for causing the lease holding members to change their position, and a holding device arranged on the side of the machine opposite to that which forces the warp thread into a plane substantially as and for the purpose set forth.

2. In a machine for leasing warps the combination with the means for holding the warp in a substantially horizontal plane, of lease holding members means for causing the said lease holding members to alternately reciprocate from above to below the warp plane and from below to the top of the latter, means for driving the said means, the means for changing the position of the lease holding members being temporarily separated from their driving means and means adapted to cause the chain threads to be separately engaged between the said lease holding means after they have been separated from their driving means, substantially as and for the purpose set forth.

3. In a machine for leasing warps the combination with the means for holding the warp in a substantially horizontal plane, of lease holding members, slides (39, 40) connected to the said lease holding members and adapted to slide in a plane which is perpendicular to that of the warp and parallel to the warp threads, driving means adapted to cause the said slides to move oppositely and to be separated at times from said slides, and means for causing the chain threads to pass successively and separately through the gap left between the said slides and the driving means therefor, substantially as and for the purpose set forth.

4. In a machine for leasing warps the combination with the means for holding the warp in a substantially horizontal plane, of lease holding means, means for changing the position of said lease holding means, driving means operatively connected with the said means for changing the position of the lease holding means, means for temporarily separating the said means for changing the position of the said lease holding means and locking same, the said separating and locking means consisting in lifting means arranged above and beneath the warp and adapted to grasp and completely adjust the lease holding means, which have been brought into their working path, substantially as and for the purpose set forth.

5. In a machine for leasing warps the combination with the means for holding the warp in a substantially horizontal plane, of lease holding means, slides (39, 40) connected with the said lease holding means and adapted to slide in a plane which is perpendicular to the warp plane and parallel to the warp threads, driving means adapted to positively shift the said slides from one side of the warp plane to the opposite side thereof, a pair of driving hooks arranged above and below the warp plane, means adapted to cause the said driving hooks to oscillate after each change of position of the said slides and to engage the latter so as to separate them from their driving means and to lock them in position, substantially as and for the purpose set forth.

6. In a machine for leasing warps the combination with the means for holding the warp substantially in a horizontal plane, of lease holding means, of means for changing the position of said lease holding means with reference to the warp plane, a driving mechanism for said means, means for causing the warp threads to be introduced separately between the said lease holding means, a feeler adapted to be actuated by the thread to be leased, a device connecting said feeler with said driving mechanism, said feeler being adapted in inoperative position to engage the warp threads, and said driving means being adapted to be disconnected from said means for moving said lease holding members by said warp threads.

7. In a machine for leasing warps the combination with the device for holding the warp in a substantially horizontal plane, of lease holding members, means for changing the position of said lease holding members with reference to the said warp plane, means for causing the warp threads to be shifted separately and successively between the lease holding means and a driving device for the said means for changing the position of the lease holding means, this driving device comprising a pawl and ratchet wheel mechanism having a pawl (78), a locking lever (108) adapted to control the said pawl, a spring adapted to force the said locking lever into its position of rest, a member (127) adapted to move the said lever into its locking position, means for continuously moving the said member, a feeler (119) adapted to be actuated by the warp thread to be leased, and a carrying on hook (120) connected with the said feeler and adapted to couple the said locking lever with the said member (127), substantially as and for the purpose set forth.

8. In a machine for leasing warps the combination with the means for holding the warp in a substantially horizontal plane, of leasing means and of a plurality of rotatable smoothing members, and means for moving the said smoothing members toward the end of the chain so as to cause them to tension the warp threads and to juxtapose them parallelly in one plane, substantially as and for the purpose set forth.

9. In a machine for leasing warps the combination with a warp holder, of leasing means, a member attached to said machine at the side with which said machine approaches said warp, said member being provided with an inclined surface adapted to receive successively the warp threads so as to gradually increase the tension thereof before the thread to be leased is separated from the others, substantially as and for the purpose set forth.

10. In a machine for leasing warps the combination, with means for holding the warp, of leasing means, a plurality of smoothing members and of means for intermittently bringing said smoothing members in engagement with said warp, said means being adapted to move said members substantially in the direction of the threads of said warp.

11. In a machine for leasing warps the combination with the chain holding means of leasing means, smoothing members, a bearing surface for the warp threads to be smoothed, this bearing surface being spring controlled and movably arranged under the said warp threads and means for actuating the said smoothing members so as to cause them to act against the said bearing surface, substantially as and for the purpose set forth.

12. In a machine for leasing warps the combination with the chain holding device, of leasing means, smoothing bolts (131) for the chain threads, a carrier for the said smoothing bolts, a shaft for the said carrier, this shaft being transversely directed with reference to the said smoothing bolts and means for rotating step by step the said carrier, substantially as and for the purpose set forth.

13. In a machine for leasing warps the combination with the warp holding device of leasing means, means for smoothing and tensioning the said warp threads, tools for separating the warp thread to be leased from the remaining ones, and means operatively connected with said smoothing means for exerting pressure on the said warp threads in front of the said separating tools during the smoothing of the threads so as to force and juxtapose them in the same plane, substantially as and for the purpose set forth.

14. In a machine for leasing warps the combination with the warp holding device of leasing means, means for smoothing and tightening the warp threads, tools for separating the warp thread to be leased from the remaining ones, a receiving surface (129) arranged under the warp threads in front of the said separating tools and adapted to receive the said tools, a pressure surface (130) provided above the said receiving surface and the warp threads in front of said separating tools and means for causing the said pressure plate (130) to be moved against the said receiving surface, substantially as and for the purpose set forth.

15. In a machine for leasing warps the combination with the warp holding device, of leasing tools and of means for separating that warp thread from the remaining ones, which is situated next the said leasing tools, these separating means comprising an oscillatable stop against which the warp threads are adapted to abut, a knife arranged in front of said stop at a distance corresponding to the thickness of a warp thread and means for oscillating the said knife in a plane which is perpendicular to that of the warp and parallel to the warp threads so that each time only one thread is separated, substantially as and for the purpose set forth.

16. In a machine for leasing warps the combination with the warp holding device, of leasing tools and of means for separating that warp thread from the remaining ones which is situated next the said leasing tools, these separating means comprising an oscillatable stop adapted to serve as an abutment for the warp threads, a knife arranged in front of said stop at a distance corresponding to the thickness of a warp thread, means for oscillating the said knife in a plane which is perpendicular to that of the warp and parallel to the warp threads and means for adjusting the relative distance between the said stop and the said knife so as to render the machine adapted for use in connection with warp threads of any thickness, substantially as and for the purpose set forth.

17. In a machine for leasing warps the combination with the warp holding device, of leasing tools and means for separating that warp thread from the remaining ones which is positioned next the said leasing tools these separating means comprising a stop adapted to serve as an abutment for the said warp thread to be separated, a knife arranged in front of said stop at a distance which corresponds to the thickness of a warp thread, means for causing the said separating knife to move in a plane which is at right angles to that of the warp and parallel to the warp threads and means for removing the said stop for the warp thread to be separated, out of the way of the latter, so as to leave the passage free for this thread after its separation, substantially as and for the purpose set forth.

18. In a machine for leasing warps the combination with the warp holding means, of leasing tools and means for separating that warp thread from the remaining ones which is positioned next the said leasing tools, these separating means comprising a stop adapted to serve as an abutment for the warp thread to be separated, a knife arranged in front of said stop at a distance which corresponds to the thickness of a warp thread, means for causing the said knife to move in a plane which is at right angles to that of the warp and parallel to the warp threads and means for moving the said stop into its working position and for removing it out of the way of the warp thread to be leased after its separation from the remaining ones, substantially as and for the purpose set forth.

19. In a machine for leasing warps the combination with the warp holding device of lease holding means, leasing tools arranged in front of said lease holding means, a grasping member for the warp thread to be leased and adapted to transport the said warp thread entirely away from the said leasing tools and between the said lease holding means, and means for separating the warp thread to be leased from the remaining ones, these latter means comprising a stop adapted to serve as an abutment for the warp thread to be separated, a knife arranged in front of the said stop at a distance corresponding to the thickness of a warp thread, means for causing the knife to move in a plane perpendicular to the warp plane and parallel to the warp threads, means for removing the said stop out of the way of the warp thread to be leased after its separation from its followers, a pushing member, means for causing the said pushing member to move in a plane which is at right angles with the plane of the warp and parallel to the said warp threads, this pushing member being adapted to continue the separation of the warp thread to be leased from its followers and to free it entirely so as to allow the said grasping member to grasp it, substantially as and for the purpose set forth.

20. In a machine for leasing warps the combination with the warp holding device of lease holding means, leasing tools arranged in front of said holding means, a grasping member adapted to grasp the warp thread to be leased and to transport it entirely away from the said leasing tools and between the said lease holding means, and means for separating the warp thread to be leased from its followers, these separating means comprising a stop adapted to serve as an abutment for the warp thread to be separated, a knife arranged in front of the said stop at a distance corresponding to the thickness of a warp thread, means for causing the said knife to move in a plane which is perpendicular to the warp plane and parallel to the warp threads, means for removing the said stop out of the way of said warp thread after its separation, a wedge shaped pushing member, means for causing the latter to move in a plane which is perpendicular to that of the warp and parallel to the warp threads, this pushing member being adapted to gradually continue the separation of the warp thread to be leased and to free it so as to allow of its being engaged by the said grasping member, substantially as and for the purpose set forth.

21. In a machine for leasing warps the combination with the warp holding device of lease holding means, leasing tools arranged in front of said lease holding means, a grasping member adapted to grasp the warp thread to be leased and to transport it entirely away from the said leasing tools and between the said lease holding means, and means for separating the warp thread to be leased from its followers, these separating means comprising a stop adapted to serve as an abutment for the warp thread to be separated, a knife arranged in front of the said stop at a distance corresponding to the thickness of a warp thread, means for causing the said knife to move in a plane which is perpendicular to the warp plane and parallel to the warp threads, means for removing the said stop out of the way of said warp thread after its separation, a pushing member rigidly secured to the said knife and adapted to continue the separation of the warp thread to be leased and to free it entirely so as to allow of its being engaged by the said grasping member, substantially as and for the purpose set forth.

22. In a machine for leasing warps the combination with the warp holding device, of leasing tools, lease holding members, means for separating the warp thread to be leased from its followers and for freeing it entirely therefrom, a grasping member adapted to grasp the said freed warp thread and to transport it away from the said leasing tools and between the said lease holding members and stationary members provided with notches (189) adapted to receive the leased thread from the said grasping member and to hold it, substantially as and for the purpose set forth.

23. In a machine for leasing warps the combination with the warp holding device, of leasing tools, lease holding means in the form of lease threads (33, 34), storage bobbins containing said lease threads, stationary spindles adapted to receive the said bobbins, means for changing the position of said lease threads with reference to the warp plane, the said lease threads being passed in the shape of loops through the said position changing means, and means for fixing the free ends of said lease threads, substantially as and for the purpose set forth.

24. In a machine for leasing warps the combination with the warp holding device, of leasing tools, lease holding means in the form of lease threads, storage bobbins containing the said lease threads, stationary spindles adapted to receive the said bobbins, means for changing the position of said lease threads with reference to the plane of the warp for leasing purposes, the said lease threads being passed in the shape of loops through the said position changing means, a chain (24) having an upper and a lower part and adapted to cause the warp leasing machine to advance, and means for securing the free ends of said lease threads to the lower part of said chain (24) so that the said ends are moved during the work in the opposite direction to that of the leasing machine substantially as and for the purpose set forth.

25. In a machine for leasing warps the combination with the warp holding device of a framework, leasing tools, lease holding members, means for separating the warp thread to be leased from its followers and for freeing it entirely therefrom, a grasping member adapted to grasp the said freed warp thread and to transport it across the machine away from the said leasing tools and between the said lease holding means and a stationary fork (175) secured to the machine framework and adapted to prevent the said warp thread to be leased from escaping during its transport between the said lease holding means, substantially as and for the purpose set forth.

In testimony whereof I have hereunto set my hand in presence of two witnesses.

GUSTAV HILLER.

Witnesses:
HENRY HASPER,
WOLDEMAR HAUPT.